United States Patent
Kato et al.

(10) Patent No.: US 11,635,306 B2
(45) Date of Patent: Apr. 25, 2023

(54) ROTOR FOR ROTARY ELECTRIC MACHINE

(71) Applicant: DENSO CORPORATION, Kariya (JP)

(72) Inventors: Yuriko Kato, Kariya (JP); Hiroshi Yasoshima, Kariya (JP)

(73) Assignee: DENSO CORPORATION, Kariya (JP)

( * ) Notice: Subject to any disclaimer, the term of this patent is extended or adjusted under 35 U.S.C. 154(b) by 44 days.

(21) Appl. No.: 17/324,422

(22) Filed: May 19, 2021

(65) Prior Publication Data
US 2022/0026242 A1     Jan. 27, 2022

(30) Foreign Application Priority Data

Jul. 21, 2020   (JP) ............................. JP2020-124313

(51) Int. Cl.
   G01D 5/14     (2006.01)
   G01B 7/30     (2006.01)
   H02K 1/27     (2022.01)
   H02K 1/28     (2006.01)

(52) U.S. Cl.
   CPC ............... G01D 5/14 (2013.01); G01B 7/30 (2013.01); H02K 1/27 (2013.01); H02K 1/28 (2013.01)

(58) Field of Classification Search
   CPC .................................. G01D 5/14; G01B 7/30
   See application file for complete search history.

(56) References Cited

U.S. PATENT DOCUMENTS

| | | | |
|---|---|---|---|
| 6,198,369 B1 * | 3/2001 | Ward | F02M 59/466 335/278 |
| 11,114,909 B2 * | 9/2021 | Yamada | H02K 21/16 |
| 2014/0246940 A1 * | 9/2014 | Murakami | H02K 29/12 310/156.05 |

FOREIGN PATENT DOCUMENTS

JP          2009-97924          5/2009

* cited by examiner

*Primary Examiner* — Reena Aurora
(74) *Attorney, Agent, or Firm* — Nixon & Vanderhye P.C.

(57) ABSTRACT

A rotor of a rotary electric machine includes a magnet that is a ring member arranged coaxially with a rotor core and assembled to an axial end part of the rotor core. The magnet is used for sensing a rotational angle of the rotor. The rotor core includes only one pair of core-side positioning portions which are arranged to be point-symmetric about a rotational axis. The magnet includes only one pair of magnet-side positioning portions which are arranged to be point-symmetric about the rotational axis. The magnet-side positioning portions are engaged with the core-side positioning portions, respectively, to position the magnet relative to the rotor core in a first direction, a second direction and a circumferential direction, and the magnet-side positioning portions are used as both a magnetization reference and an assembly reference.

6 Claims, 17 Drawing Sheets

ROTOR FOR ROTARY ELECTRIC MACHINE

CROSS REFERENCE TO RELATED APPLICATIONS

This application is based on and incorporates herein by reference Japanese Patent Application No. 2020-124313 filed on Jul. 21, 2020.

TECHNICAL FIELD

The present disclosure relates to a rotor for a rotary electric machine.

BACKGROUND

Conventionally, it is known that a magnet is fixed to a rotor of a rotary electric machine, and a magnetic sensor is placed adjacent to the magnet to sense a rotational angle of the rotor based on an output value of the magnetic sensor.

SUMMARY

This section provides a general summary of the disclosure, and is not a comprehensive disclosure of its full scope or all of its features.

According to the present disclosure, there is provided a rotor for a rotary electric machine, including a rotor core and a magnet. The magnet includes only one pair of magnet-side positioning portions which are arranged to be point-symmetric about a rotational axis and are engaged with only one pair of core-side positioning portions, respectively, of the rotor core to position the magnet relative to the rotor core. The magnet-side positioning portions are used as both a magnetization reference and an assembly reference.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
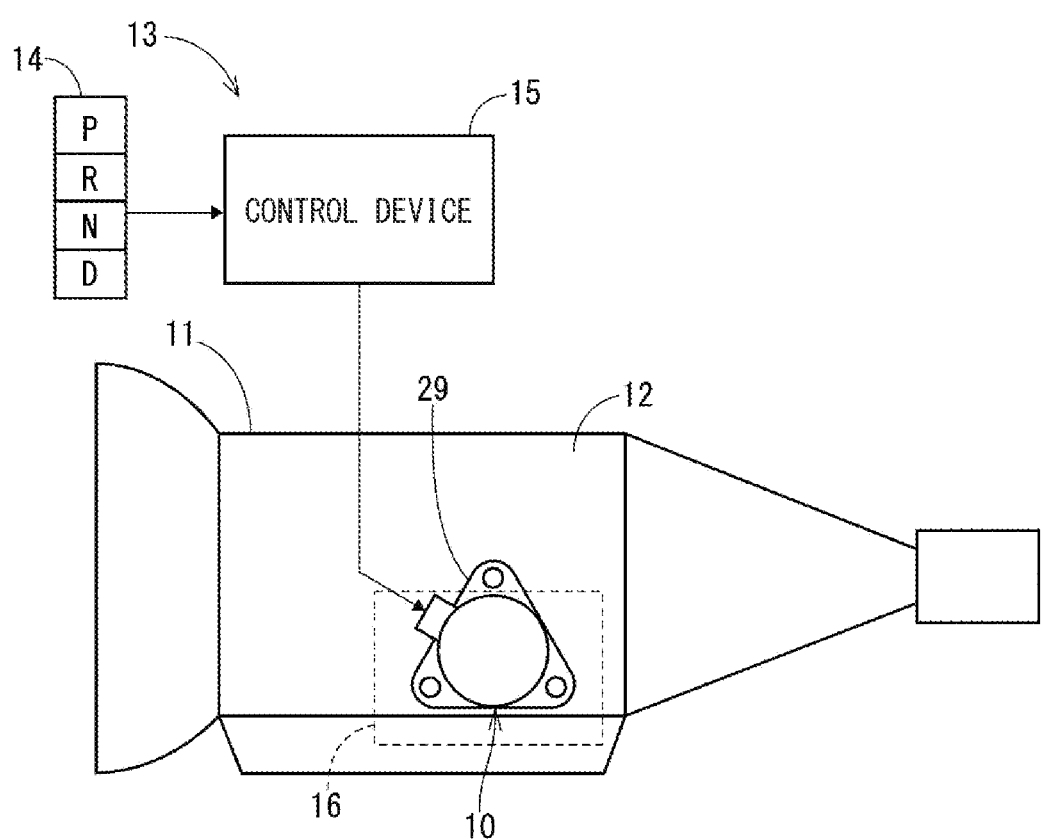
FIG. 1 is a schematic diagram illustrating a shift-by-wire system to which a rotary actuator including an electric motor of a first embodiment is applied.

Conventionally, it is known that a magnet is fixed to a rotor of a rotary electric machine, and a magnetic sensor is placed adjacent to the magnet to sense a rotational angle of the rotor based on an output value of the magnetic sensor. In a previously proposed rotational angle sensing device, a magnet, which is shaped in a ring form, is magnetized while using projections, which are placed at an inner periphery of the magnet, as a reference for the magnetization. The magnet has a plurality of S-poles and a plurality of N-poles alternately arranged in a circumferential direction. The magnet is assembled to the rotor (more specifically a rotor core) when four cylindrical pins, which axially project from the magnet, are fitted into fitting holes of the rotor.

An accuracy of sensing the rotational angle of the rotor has an influence on the control of the rotary electric machine. Therefore, an improvement for improving the rotational angle sensing accuracy of the rotor is desired.

According to the present disclosure, there is provided a rotor for a rotary electric machine, including: a rotor core that is configured to rotate about a rotational axis; and a magnet that is a ring member and is coaxial with the rotor core. The magnet is assembled to an axial end part of the rotor core and is used for sensing a rotational angle of the rotor.

In a relative coordinate system to be rotated integrally with the rotor core, a predetermined direction, which is perpendicular to the rotational axis, is defined as a first direction, and a direction, which is perpendicular to the rotational axis and the first direction, is defined as a second direction, and a direction along a circumference about the rotational axis is defined as a circumferential direction. The rotor core includes only one pair of core-side positioning portions which are arranged to be point-symmetric about the rotational axis. The magnet includes only one pair of magnet-side positioning portions which are arranged to be point-symmetric about the rotational axis and are engaged with the core-side positioning portions, respectively, to position the magnet relative to the rotor core in the first direction, the second direction and the circumferential direction. The magnet-side positioning portions are used as both a magnetization reference and an assembly reference.

By providing only the one pair of magnet-side positioning portions to be used not only as the assembly reference but also as the magnetization reference, the amount of deviation from the ideal position of the respective magnetic poles of the magnet relative to the rotor core becomes smaller than that of the previously proposed technic where the assembly reference is provided separately from the magnetization reference. Specifically, in the present disclosure, the amount of misalignment is reduced in comparison to that of the previously proposed technique because there is no misalignment between the assembly reference and the magnetization reference. Therefore, the sensing accuracy of the rotational angle using the magnet is improved, and the performance of the rotary electric machine is improved.

Hereinafter, various embodiments of an electric motor (serving as a rotary electric machine) will be described with reference to the drawings. The same reference sign is used for substantially identical components among the embodiments, and the description thereof will be omitted for the sake of simplicity.

First Embodiment

With reference to FIG. 1, an electric motor 30 of a first embodiment is installed to a rotary actuator (hereinafter referred to as an actuator) 10. The actuator 10 is fixed to an outer wall of a case 12 of a vehicle transmission 11 and is used as a drive source of a shift-by-wire system 13. In the shift-by-wire system 13, a control device 15 controls the actuator 10 based on a command signal outputted from a shift operation device 14, so that a shift range change mechanism 16 of the transmission 11 is driven to change a shift range.

(Actuator)

Figure 2:
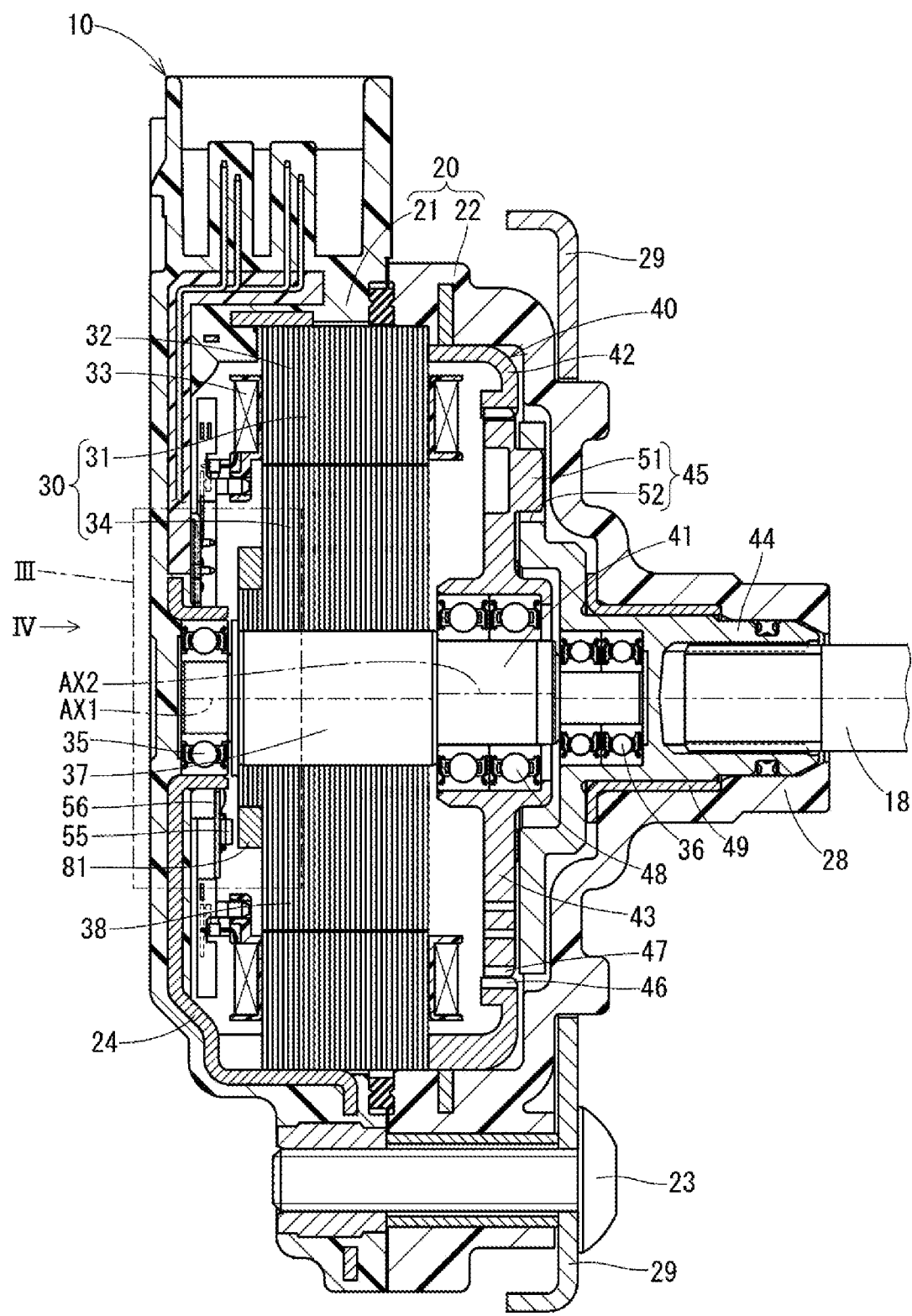
FIG. 2 is a cross-sectional view of the rotary actuator of FIG. 1.
Figure 3:
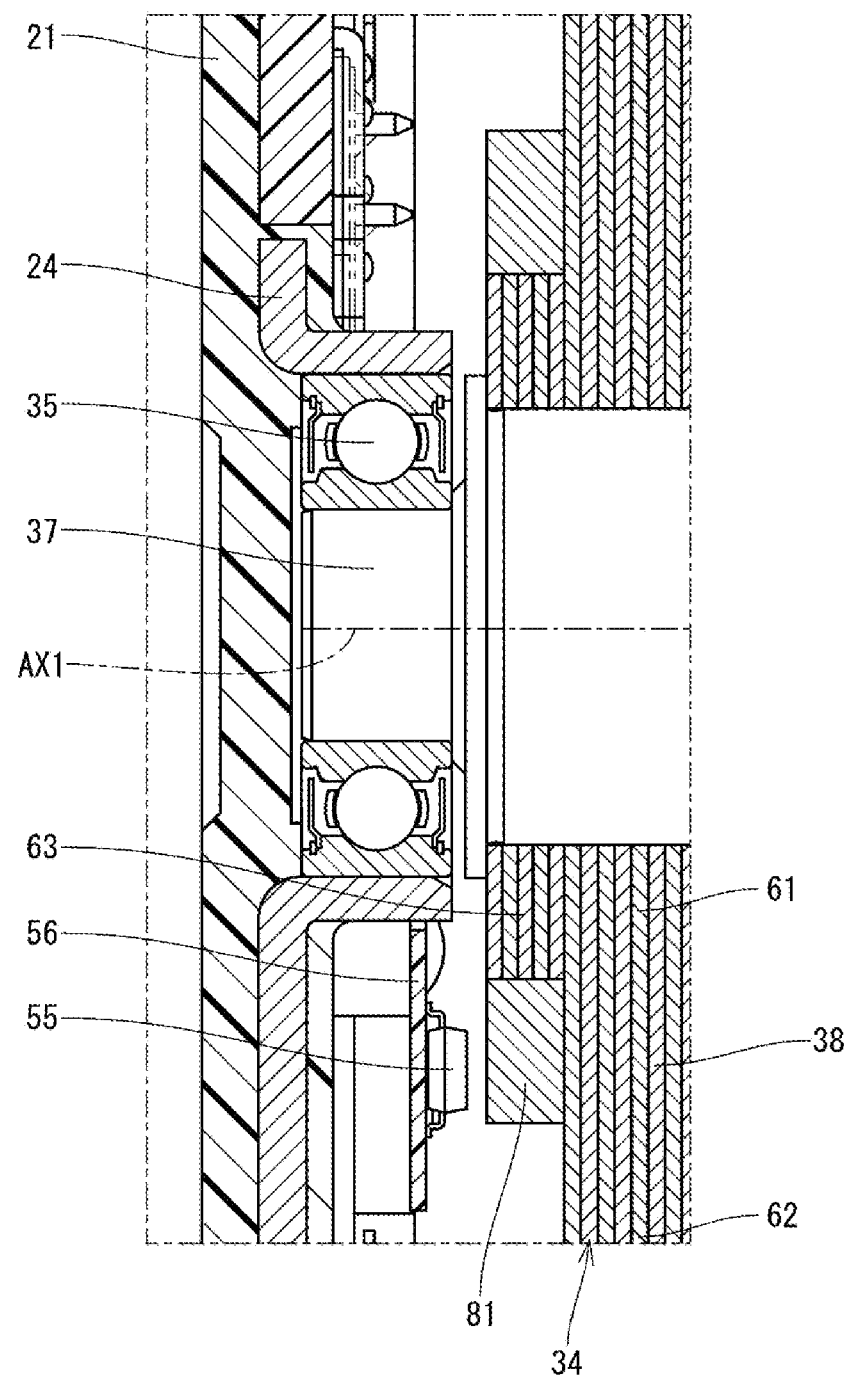
FIG. 3 is a partial enlarged view of a portion III in FIG. 2.
Figure 4:
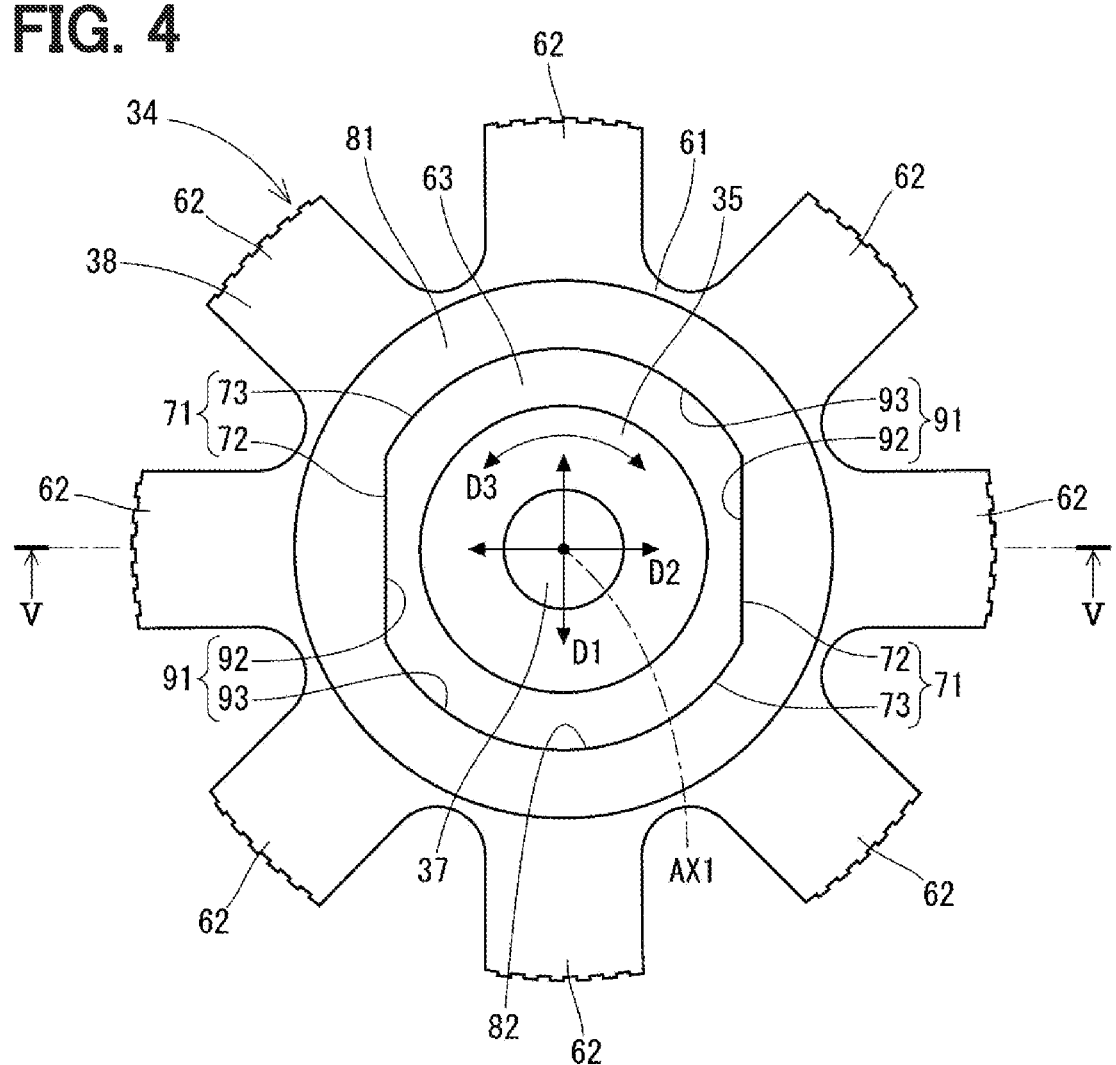
FIG. 4 is a view of a rotor and a motor-side bearing as viewed in a direction of an arrow IV in FIG. 2.

First, an overall structure of the actuator 10 will be described with reference to FIG. 2. The actuator 10 includes a housing 20, the electric motor 30 and a speed reducer 40.

The housing 20 includes a front housing 21 and a rear housing 22 which are respectively shaped in a cup form. The front housing 21 and the rear housing 22 are assembled and fixed together with bolts 23 in a state where an opening of the front housing 21 and an opening of the rear housing 22 are opposed to each other. A metal plate 24, which is shaped in a bottomed tube form, is inserted in the front housing 21. The rear housing 22 includes a tubular projection 28 which projects away from the front housing 21. A bracket 29 is fixed to an outer wall of the rear housing 22. The actuator 10 is fixed to the case 12 (see FIG. 1) of the transmission 11 through the bracket 29.

The electric motor 30 includes a stator 31 and a rotor 34 which are received in the housing 20. The stator 31 includes a stator core 32 and a plurality of windings 33. The stator core 32 is fixed to the metal plate 24 by, for example, press-fitting, and the windings 33 are wound around the stator core 32. The rotor 34 includes a rotatable shaft 37 and a rotor core 38. The rotatable shaft 37 is supported by a motor-side bearing 35 and a speed-reducer-side bearing 36 and is rotatable about a rotational axis AX1. The rotor core 38 is securely engaged to an outer peripheral surface of the rotatable shaft 37. The motor-side bearing 35 is installed to the metal plate 24. The speed-reducer-side bearing 36 is installed to an output member 44 described later.

The speed reducer 40 includes an eccentric shaft 41, a ring gear 42, an eccentric gear 43, the output member 44 and a transmission mechanism 45. The eccentric shaft 41 is located on an eccentric axis AX2 that is eccentric to the rotational axis AX1, and the eccentric shaft 41 is formed integrally with the rotatable shaft 37 in one-piece. The ring gear 42 is coaxial with the rotational axis AX1 and is fixed to the rear housing 22. The eccentric gear 43 includes external teeth 47 that are meshed with internal teeth 46 of the ring gear 42, and the eccentric gear 43 is supported by a bearing 48 installed to the eccentric shaft 41 such that the eccentric gear 43 can make a planetary motion. The planetary motion refers to a motion of revolving around the rotational axis AX1 while spinning around the eccentric axis AX2. During the planetary motion, the spin speed of the eccentric gear 43 is changed relative to the rotational speed of the rotatable shaft 37.

The output member 44 is coaxial with the rotational axis AX1 and is rotatably supported by a bearing 49 installed to the rear housing 22. The transmission mechanism 45 includes an engaging projection 51, which is formed at the eccentric gear 43, and an engaging hole 52, which is formed at the output member 44 and receives the engaging projection 51. The transmission mechanism 45 transmits the spin motion of the eccentric gear 43 about the eccentric axis AX2 to the output member 44.

In the actuator 10, a rotating magnetic field is generated by shifting a phase to be energized among a plurality of phases of the windings 33. The rotor 34 receives a magnetic attractive force or a magnetic repulsive force generated by this rotating magnetic field and is thereby rotated. When the eccentric shaft 41 revolves around the rotational axis AX1 together with the rotor 34, the eccentric gear 43 makes the planetary motion. Therefore, the rotation of the eccentric gear 43, the speed of which is reduced in comparison to the rotation of the rotor 34, is outputted from the output member 44.

(Rotor)

Next, the rotor 34 and the sensing of a rotational angle of the rotor 34 will be described with reference to FIGS. 2 to 9. Hereinafter, a direction, which is parallel to the rotational axis AX1, will be referred to as an axial direction. Furthermore, a direction along a circumference about the rotational axis AX1, will be referred to as a circumferential direction.

The rotor 34 includes a rotor core 38 and a magnet (permanent magnet) 81. The rotor core 38 is configured to be rotated about the rotational axis AX1. The magnet 81 is assembled to an axial end part of the rotor core 38. The magnet 81 is used for sensing the rotational angle of the rotor 34.

The actuator 10 includes a circuit board 56 on which a magnetic sensor 55 is installed. The magnetic sensor 55 is opposed to the magnet 81 in the axial direction. The circuit board 56 is fixed to the front housing 21. The magnetic sensor 55 senses a state of the magnetic field, which changes according to the rotational angle of the rotor 34, and the magnetic sensor 55 converts the sensed state of the magnetic field to an electric signal. The magnetic sensor 55 and the magnet 81 form a rotation sensing unit that senses the rotational angle of the rotor 34.

Figure 5:
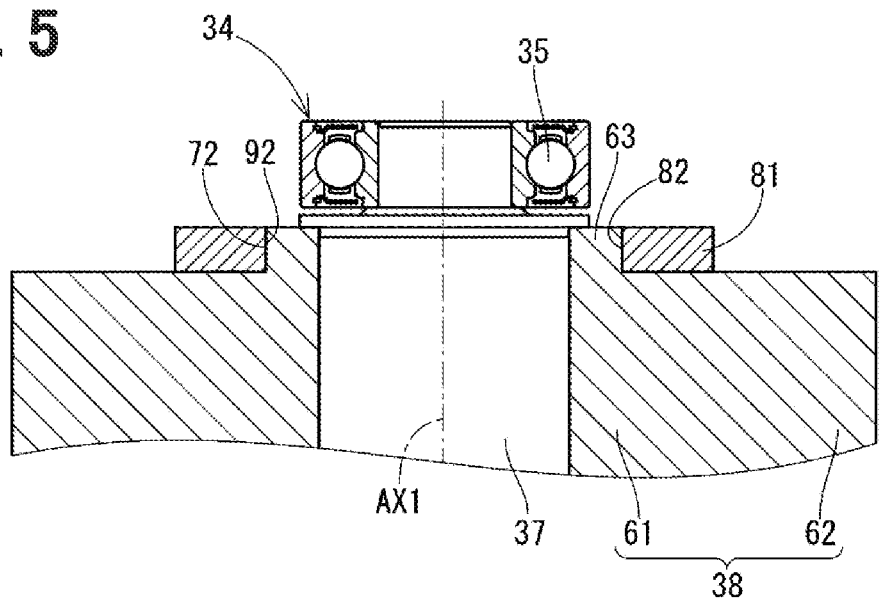
FIG. 5 is a cross-sectional view of the rotor and the motor-side bearing taken along line V-V in FIG. 4.
Figure 6:
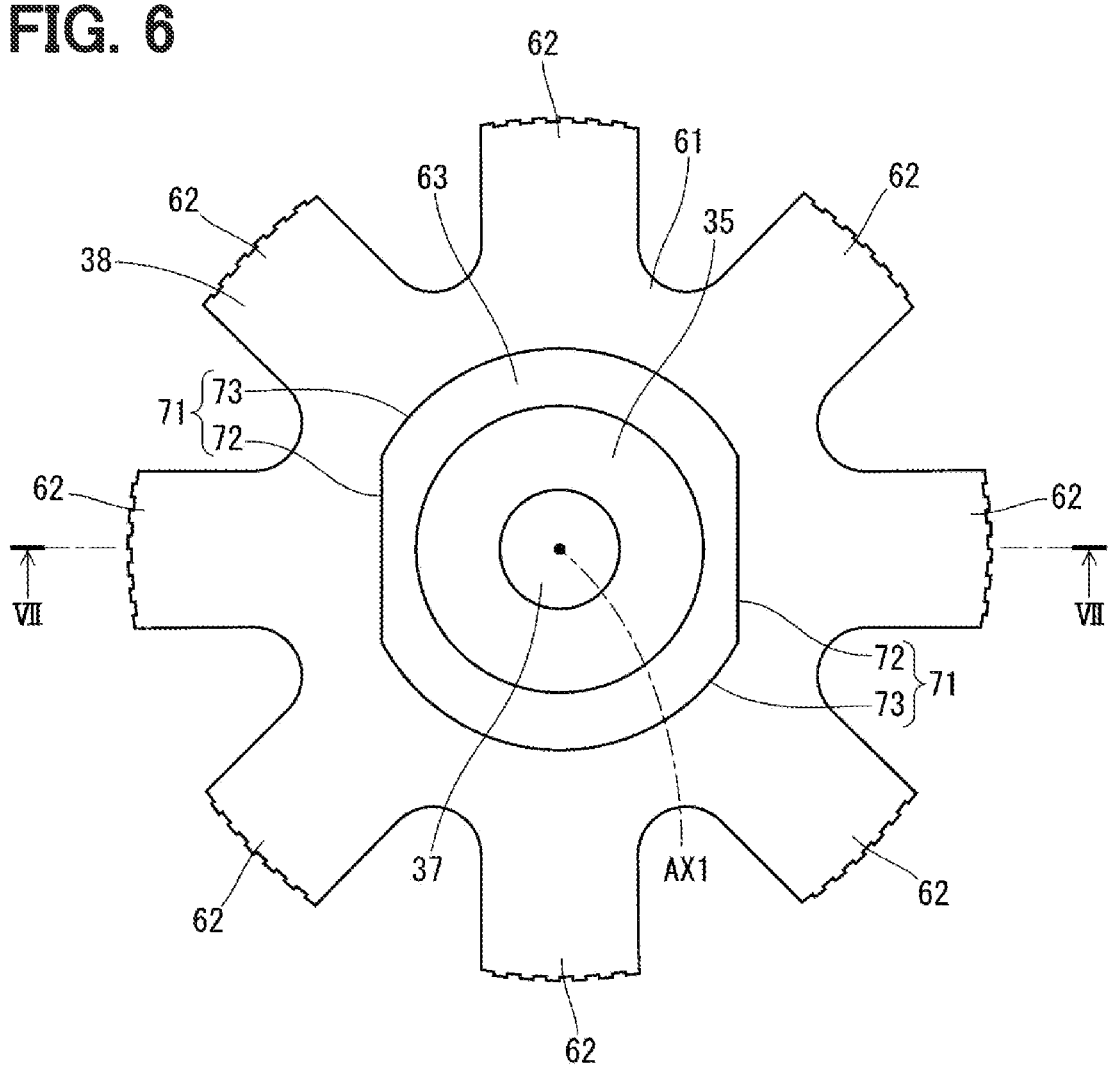
FIG. 6 is a diagram indicating a rotor core, a rotatable shaft and a motor-side bearing of FIG. 4.
Figure 7:
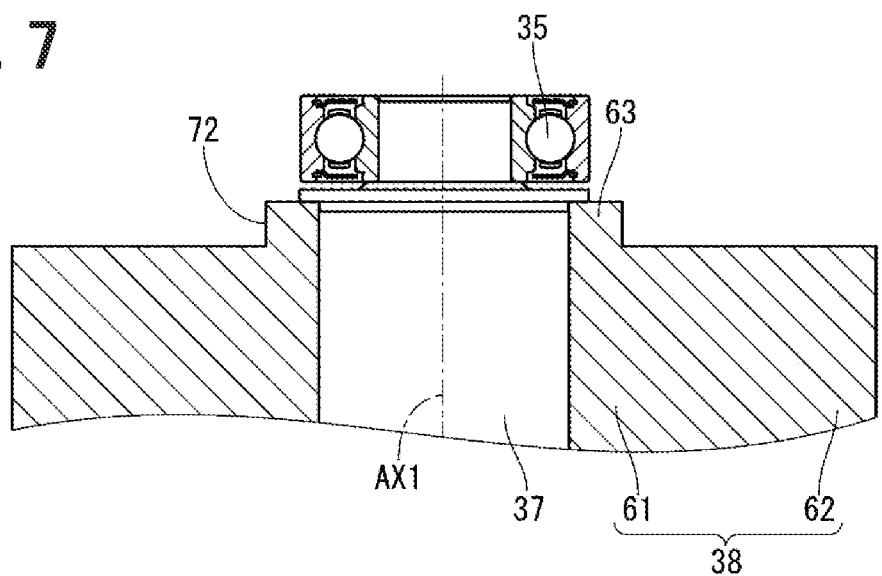
FIG. 7 is a cross-sectional view of the rotor core, the rotatable shaft and the motor-side bearing taken along line VII-VII in FIG. 6.
Figure 8:
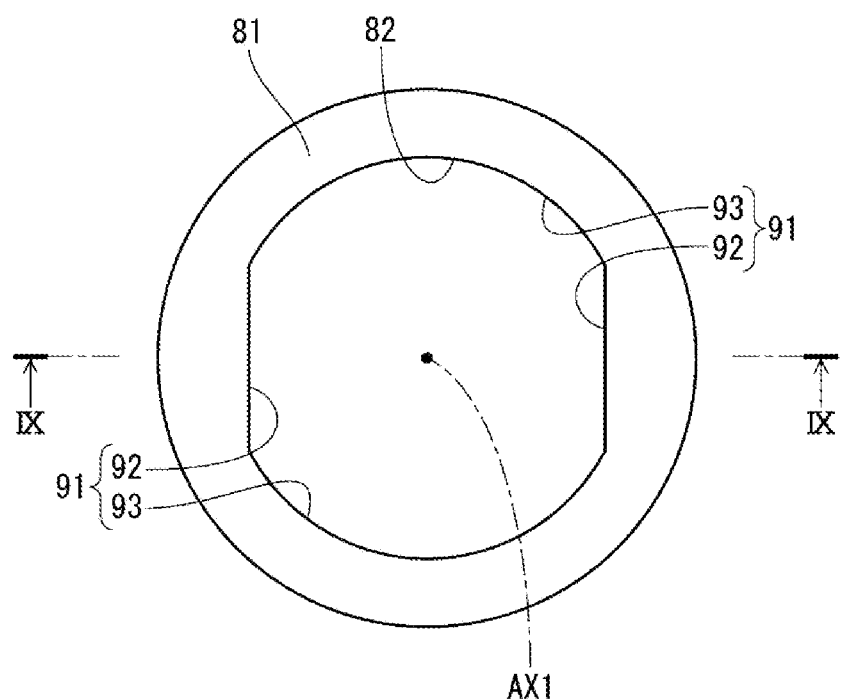
FIG. 8 is a diagram indicating a magnet of FIG. 4.
Figure 9:
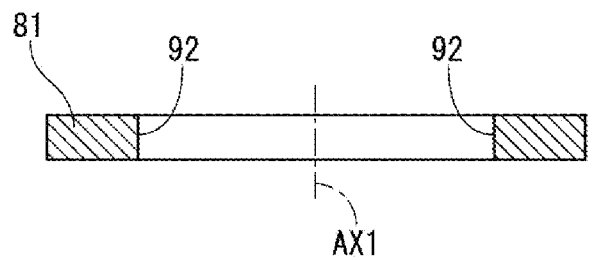
FIG. 9 is a cross-sectional view of the magnet taken along line IX-IX in FIG. 8.
Figure 10:
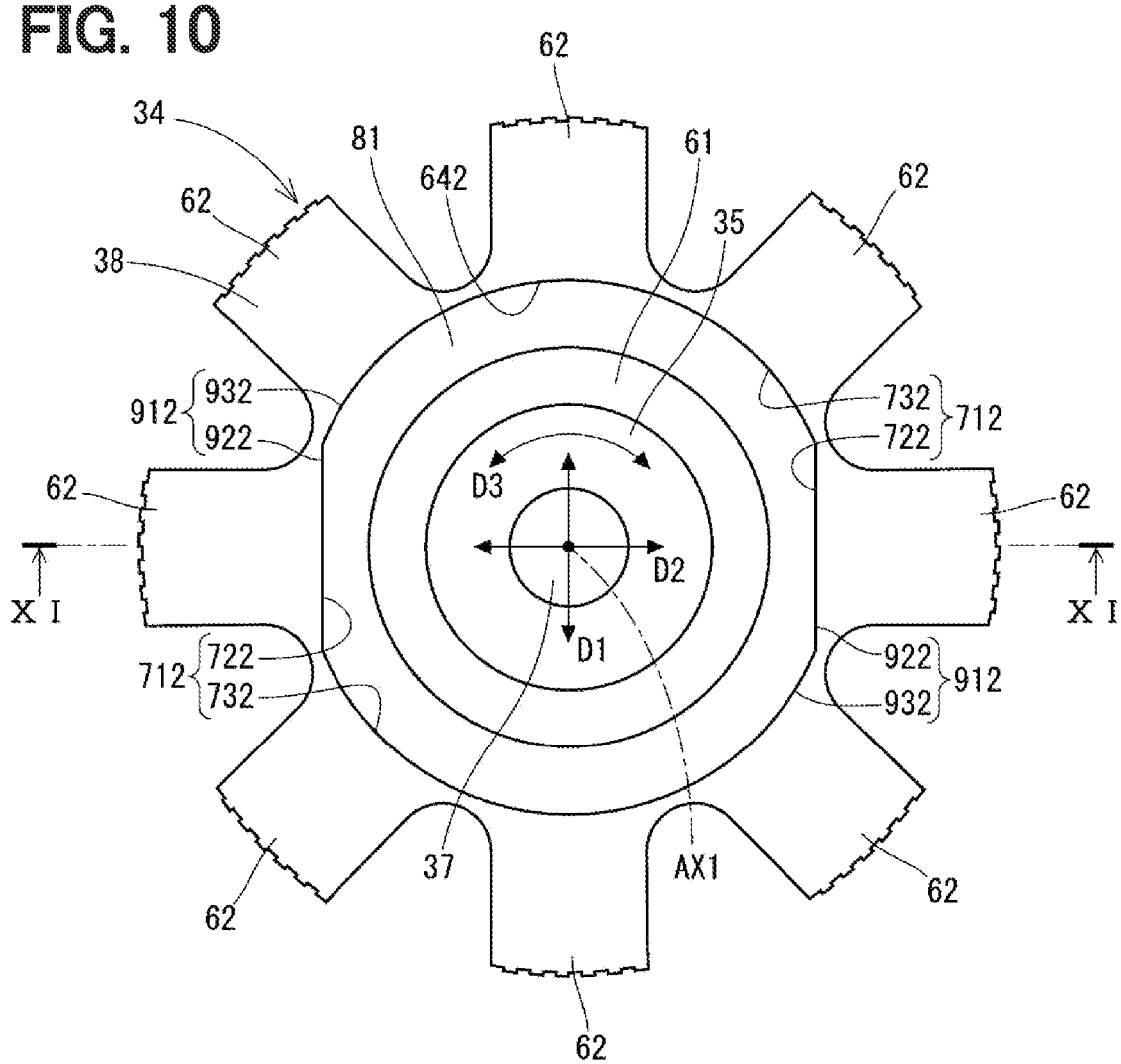
FIG. 10 is a view of a rotor and a motor-side bearing of a second embodiment as viewed in the axial direction.
Figure 11:
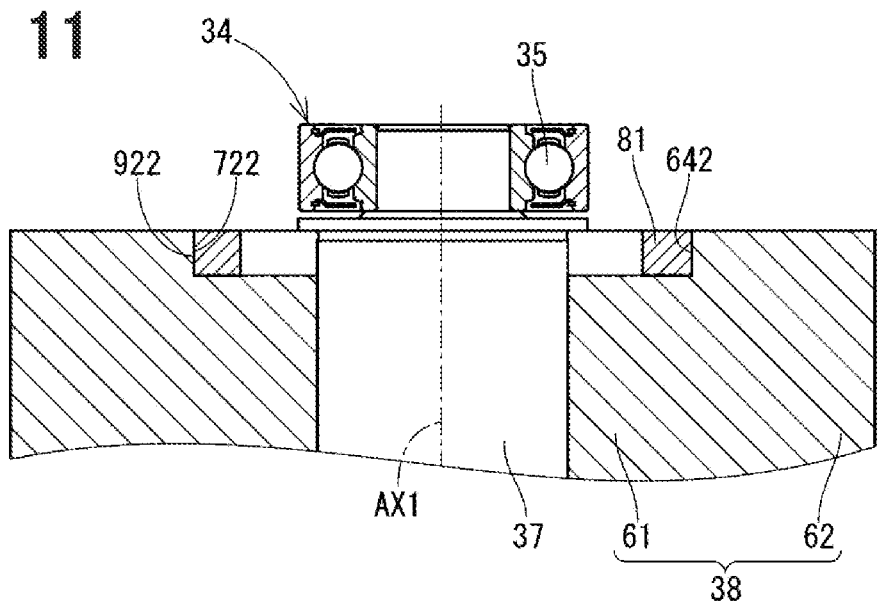
FIG. 11 is a cross-sectional view of the rotor and the motor-side bearing taken along line XI-XI in FIG. 10.
Figure 12:
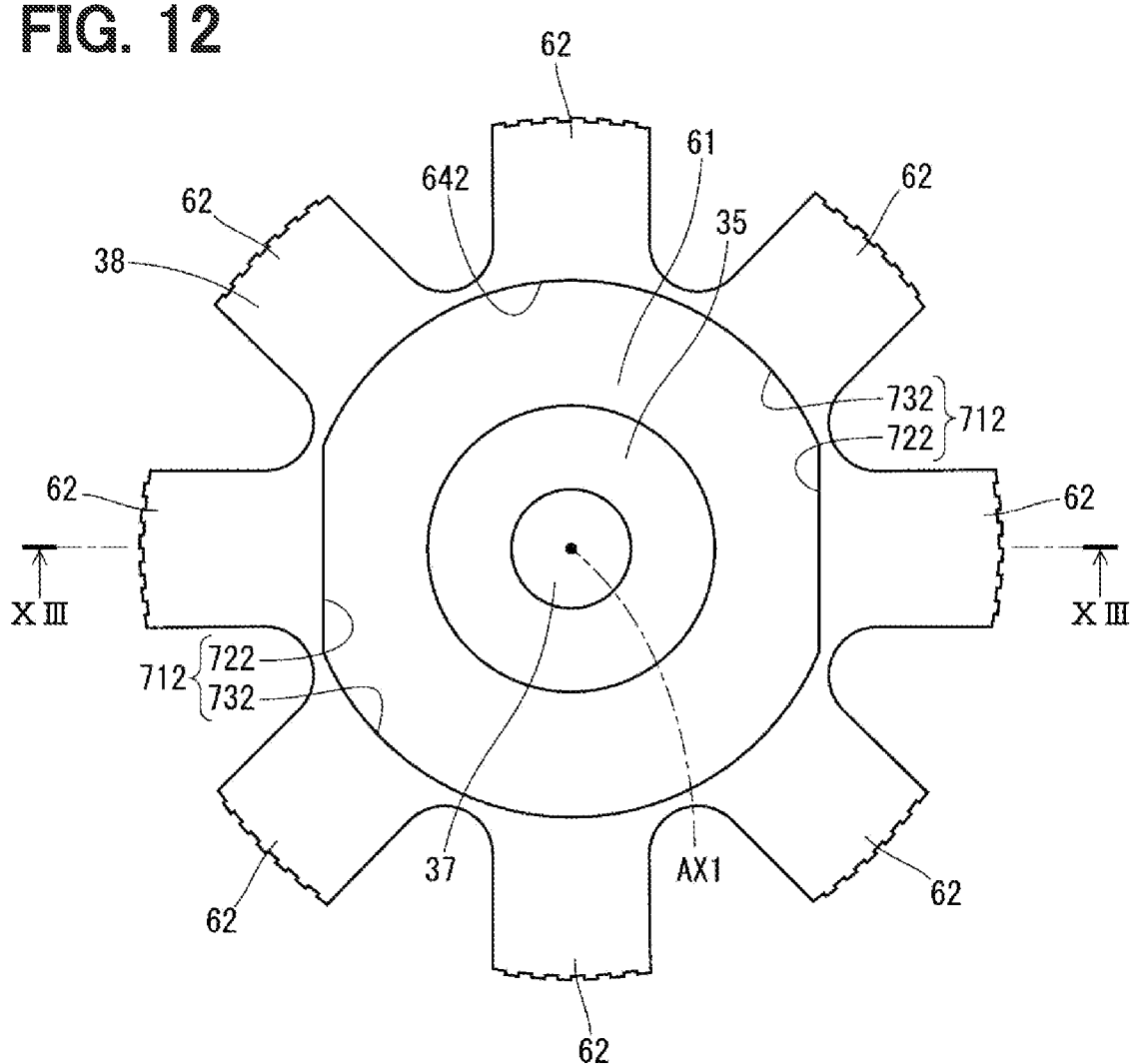
FIG. 12 is a diagram indicating a rotor core, a rotatable shaft and a motor-side bearing of FIG. 10.
Figure 13:
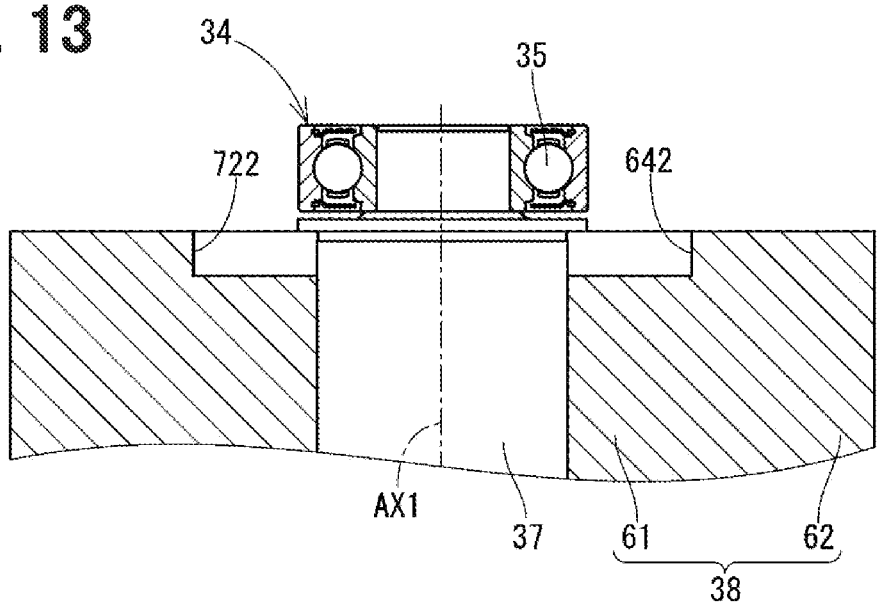
FIG. 13 is a cross-sectional view of the rotor core, the rotatable shaft and the motor-side bearing taken along line XIII-XIII in FIG. 12.
Figure 14:
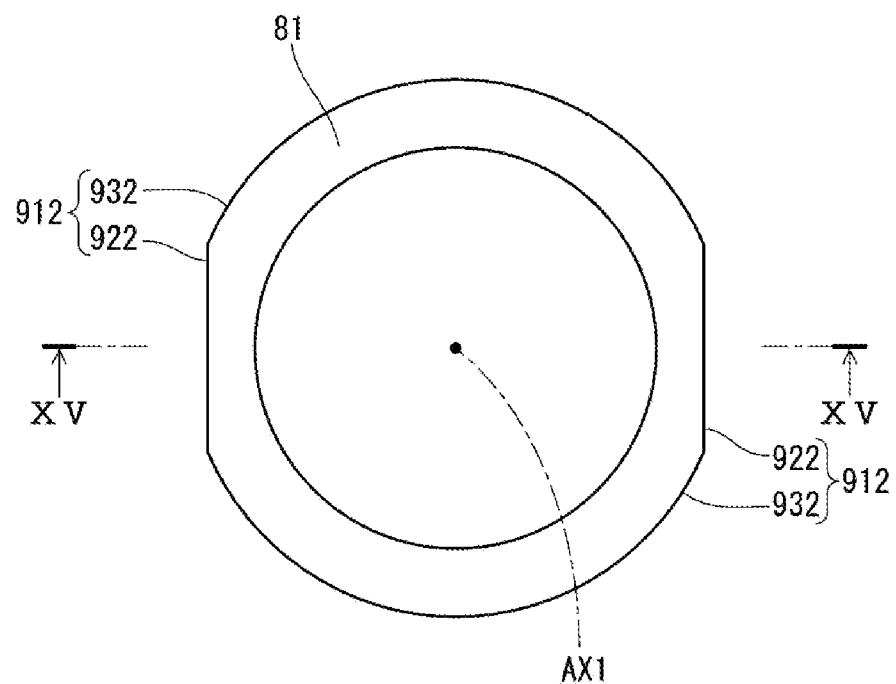
FIG. 14 is a diagram indicating a magnet of FIG. 10.
Figure 15:
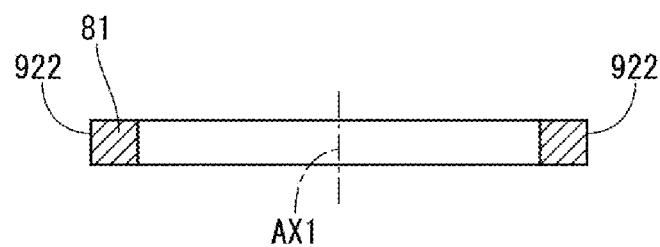
FIG. 15 is a cross-sectional view of the magnet taken along line XV-XV in FIG. 14.
Figure 16:
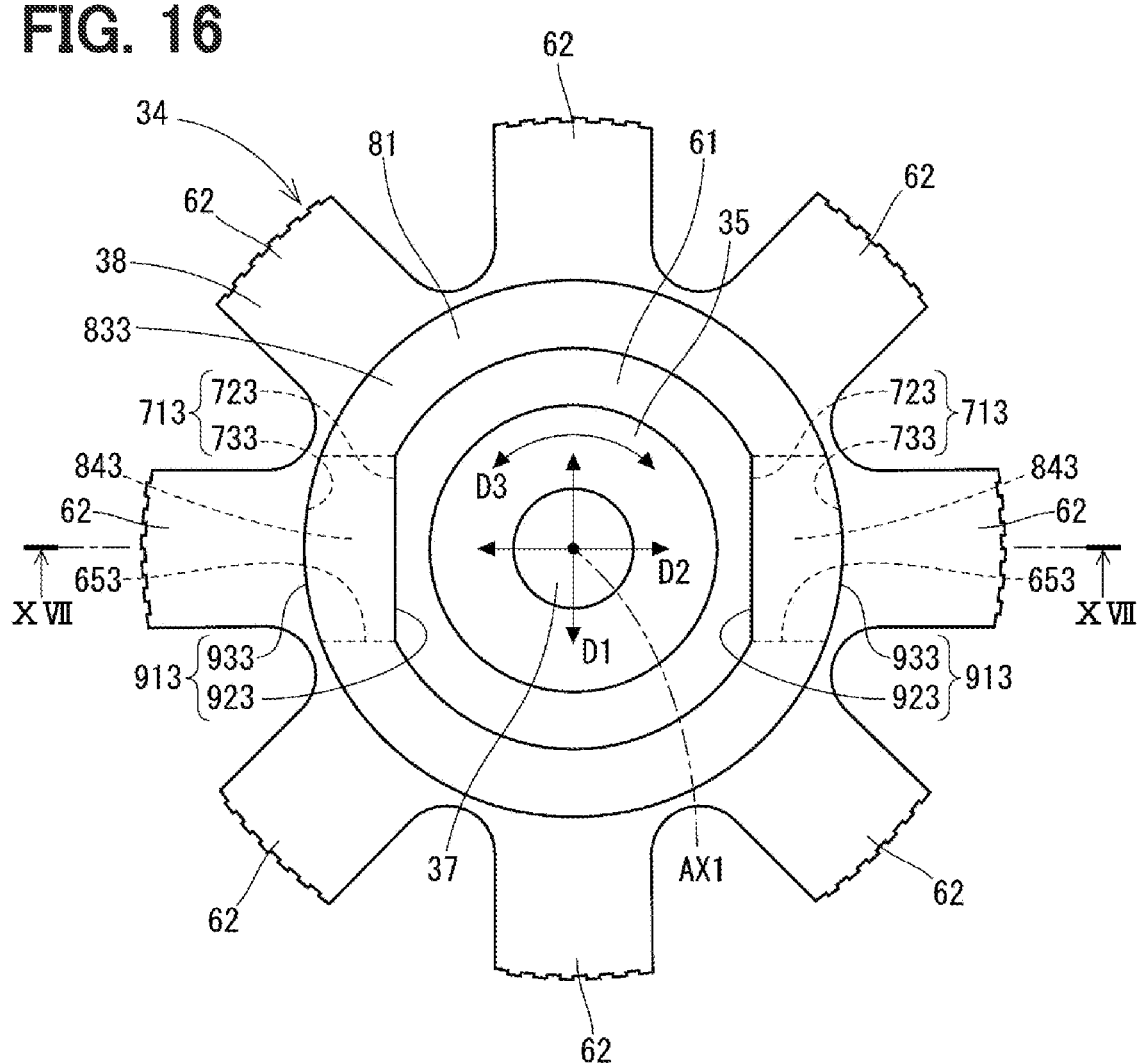
FIG. 16 is a view of a rotor and a motor-side bearing of a third embodiment as viewed in the axial direction.
Figure 17:
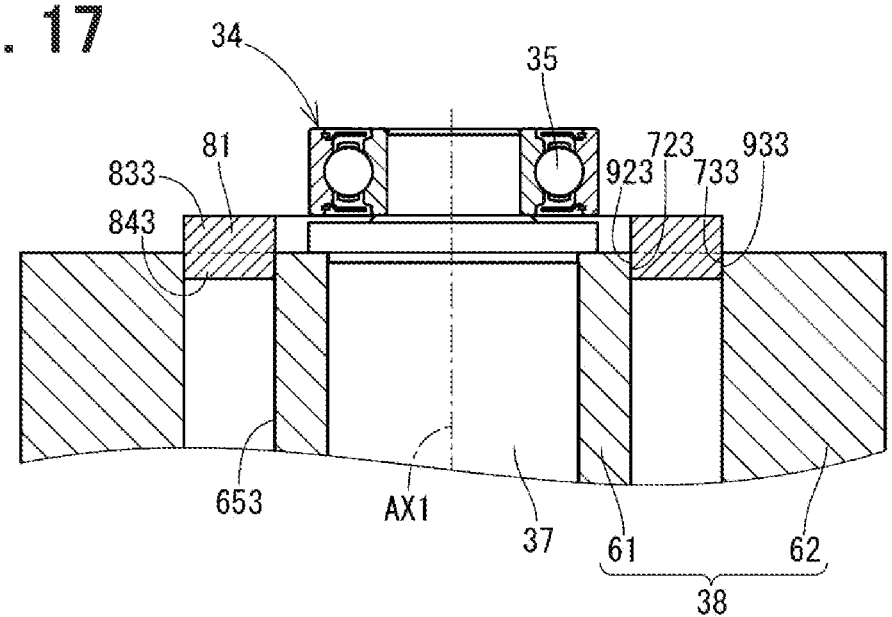
FIG. 17 is a cross-sectional view of the rotor and the motor-side bearing taken along line XVII-XVII in FIG. 16.
Figure 18:
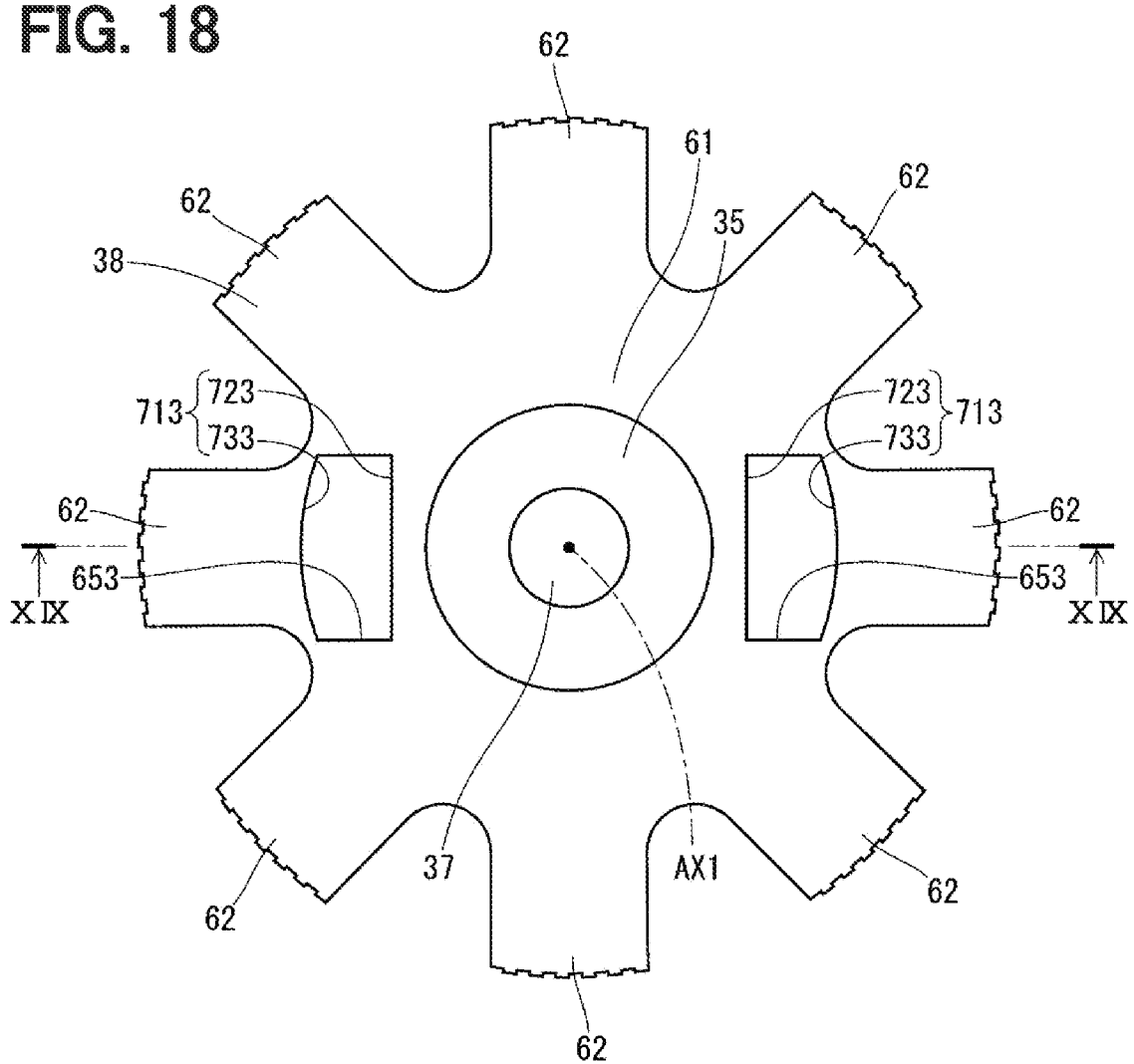
FIG. 18 is a diagram indicating a rotor core, a rotatable shaft and a motor-side bearing of FIG. 16.
Figure 19:
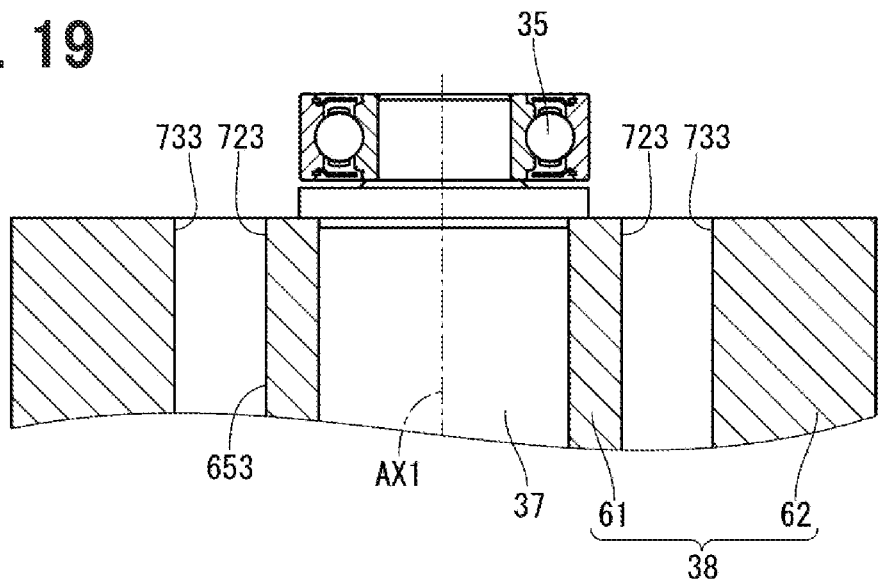
FIG. 19 is a cross-sectional view of the rotor core, the rotatable shaft and the motor-side bearing taken along line XIX-XIX in FIG. 18.
Figure 20:
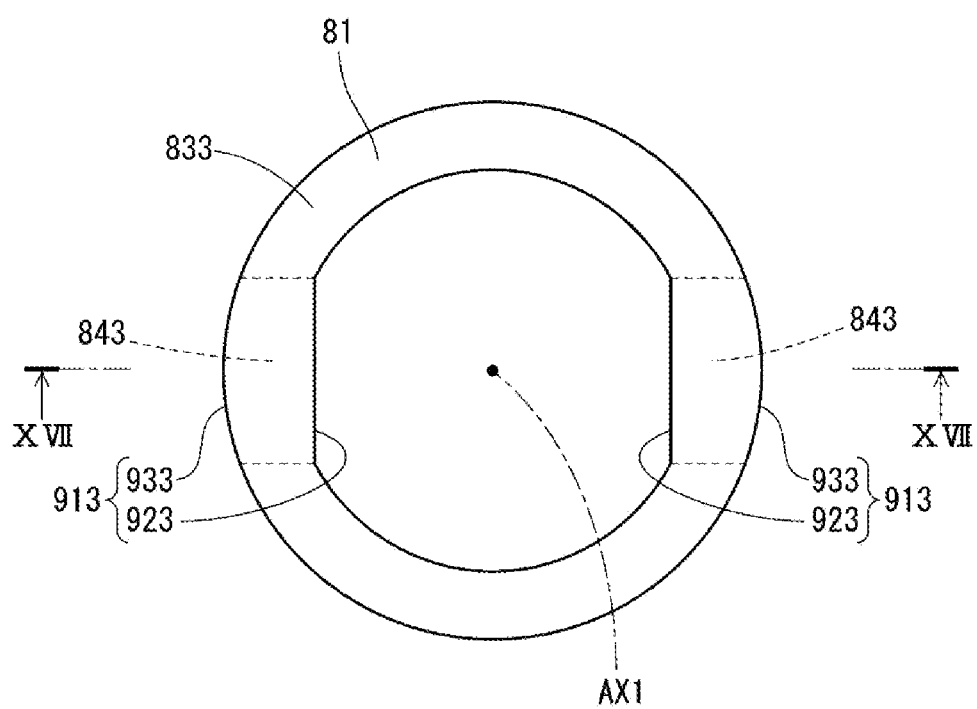
FIG. 20 is a diagram indicating a magnet of FIG. 16.
Figure 21:
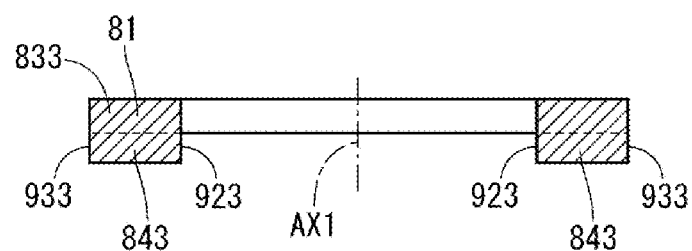
FIG. 21 is a cross-sectional view of the magnet taken along line XXI-XXI in FIG. 20.

The rotor core 38 is a laminated body formed by a plurality of metal plates which are stacked. In order to avoid complexities, FIGS. 5 and 7 show the rotor core 38 as if it were made of a single member, but in fact it is made of the metal plates which are stacked. The rotor core 38 includes a center body 61, which is coaxial with the rotational axis AX1, and a plurality of salient poles 62, which radially outwardly project from the center body 61. The center body 61 has a center protrusion 63 that is shaped in a ring form and projects toward one axial side, i.e., toward the circuit board 56.

The rotor core 38 includes only one pair of core-side positioning portions 71 which are arranged to be point-symmetric about the rotational axis AX1. The core-side positioning portions 71 are formed at a radially outer wall of the center protrusion 63. In a relative coordinate system to be rotated integrally with the rotor core 38, a predetermined direction, which is perpendicular to the rotational axis AX1, is defined as a first direction D1, and a direction, which is perpendicular to the rotational axis AX1 and the first direction D1, is defined as a second direction D2, and a direction along a circumference about the rotational axis AX1 is defined as a circumferential direction D3. Each of the core-side positioning portions 71 includes a planar surface 72, which is parallel with the first direction D1, and a partial cylindrical surface 73, which has a center of curvature located on the rotational axis AX1. The planar surfaces 72 of the core-side positioning portions 71 form a two-sided segment while the two-sided segment is defined as a segment that has two planar surfaces which are located at two diametrically opposite sides of the two-sided segment and are parallel with each other. The core-side positioning portions 71 are formed at the radially outer wall of the center protrusion 63 such that the core-side positioning portions 71 continuously extend all around the rotational axis AX1.

The magnet 81 includes only one pair of magnet-side positioning portions 91 which are arranged to be point-symmetric about the rotational axis AX1. The magnet-side positioning portions 91 are formed at a radially inner wall of the magnet 81. Each of the magnet-side positioning portions 91 includes a planar surface 92, which is parallel with the first direction D1, and a partial cylindrical surface 93, which has a center of curvature located on the rotational axis AX1. The planar surfaces 92 of the magnet-side positioning portions 91 are parallel with each other. The magnet-side positioning portions 91 are formed at the radially inner wall of the magnet 81 such that the magnet-side positioning portions 91 continuously extend all around the rotational axis AX1, and the magnet-side positioning portions 91 form a center fitting hole 82 which are located on the radially inner side of the magnet-side positioning portions 91 and can be fitted to the radially outer wall of the center protrusion 63.

Magnetization of the magnet 81 is performed prior to assembly of the magnet 81 to the rotor core 38. At this time, the magnetization of the magnet 81 is performed while the magnet-side positioning portions 91 are used as a reference for the magnetization. Specifically, the magnet-side positioning portions 91 are used as a magnetization reference. Hereinafter, a deviation of a position of respective magnetic poles of the magnet 81 from an ideal position thereof relative to the magnetization reference will be referred to as "magnetization misalignment."

The magnet 81 is assembled to the end part of the rotor core 38 by fitting the center fitting hole 82 to the center protrusion 63 and magnetically coupling the magnet 81 to the rotor core 38 by the magnetic attractive force of the magnet 81. The magnet-side positioning portions 91 are engaged with the core-side positioning portions 71, respectively, to position the magnet 81 relative to the rotor core 38 in the first direction D1, the second direction D2 and the circumferential direction D3. Specifically, each of the planar surfaces 92 is engaged with a corresponding one of the planar surfaces 72 to limit relative misalignment of the magnet 81 in the second direction D2 and the circumferential direction D3, and each of the partial cylindrical surfaces 93 is engaged with a corresponding one of the partial cylindrical surfaces 73 to limit relative misalignment of the magnet 81 in the first direction D1. The magnet-side positioning portions 91 are used as both the magnetization reference and the assembly reference. Hereinafter, a fitting play between the center fitting hole 82 and the center protrusion 63 will be referred to as "assembly play."

Advantages

As described above, in the first embodiment, the rotor 34 of the electric motor (rotary electric machine) 30 includes the magnet 81 that is the ring member arranged coaxially with the rotor core 38 and is assembled to the axial end part of the rotor core 38. The magnet 81 is used for sensing the rotational angle of the rotor 34. The rotor core 38 includes only the one pair of core-side positioning portions 71 which are arranged to be point-symmetric about the rotational axis AX1. The magnet 81 includes only the one pair of magnet-side positioning portions 91 which are arranged to be point-symmetric about the rotational axis AX1. The magnet-side positioning portions 91 are engaged with the core-side positioning portions 71, respectively, to position the magnet 81 relative to the rotor core 38 in the first direction D1, the second direction D2 and the circumferential direction D3, and the magnet-side positioning portions 91 are used as both the magnetization reference and the assembly reference.

By providing only the one pair of magnet-side positioning portions 91 to be used not only as the assembly reference but also as the magnetization reference, the amount of deviation from the ideal position of the respective magnetic poles of the magnet 81 relative to the rotor core 38 becomes smaller than that of the previously proposed technique where the assembly reference is provided separately from the magnetization reference. In other words, although the magnetization misalignment and the assembly play may exist in this system like in the previously proposed system, the amount of misalignment and the amount of assembly play can be smaller than those of the previously proposed system because there is no misalignment between the assembly reference and the magnetization reference. Therefore, the sensing accuracy of the rotational angle using the magnet 81 is improved, and the performance of the electric motor 30 is improved.

Furthermore, in the first embodiment, each of the magnet-side positioning portions 91 includes the planar surface 92 that is formed at the radially inner wall of the magnet 81 and is parallel with the first direction D1. As a result, when the magnet 81 is positioned by fitting the center fitting hole 82 to the center protrusion 63, which is concentric with the rotational axis AX1, the misalignment between the center of the magnet 81 and the center of the rotor core 38 is less likely to occur in comparison to the previously proposed technique where the four pins arranged in the circumferential direction are fitted to the holes of the rotor core.

Second Embodiment

In a second embodiment, as shown in FIGS. 10 to 15, the center body 61 has a center fitting hole 642 in place of the center protrusion 63 of the first embodiment. The center fitting hole 642 is recessed toward the side that is opposite to the circuit board 56.

Only one pair of core-side positioning portions 712 are formed at the radially inner wall of the center fitting hole 642 such that the core-side positioning portions 712 continuously extend all around the rotational axis AX1. Each of the core-side positioning portions 712 includes a planar surface 722, which is parallel with the first direction D1, and a partial cylindrical surface 732, which has a center of curvature located on the rotational axis AX1. The planar surfaces 722 of the core-side positioning portions 712 are parallel with each other.

Only one pair of magnet-side positioning portions 912 are formed at the radially outer wall of the magnet 81 such that the magnet-side positioning portions 912 continuously extend all around the rotational axis AX1, and the magnet-side positioning portions 912 can be fitted to the center fitting hole 642. Each of the magnet-side positioning portions 912 includes a planar surface 922, which is parallel with the first direction D1, and a partial cylindrical surface 932, which has a center of curvature located on the rotational axis AX1. The planar surfaces 922 of the magnet-side positioning portions 912 form a two-sided segment while the two-sided segment is defined as a segment that has two planar surfaces which are located at two diametrically opposite sides of the two-sided segment and are parallel with each other.

In the second embodiment, the rotor core 38 includes only the one pair of core-side positioning portions 71 which are arranged to be point-symmetric about the rotational axis AX1. The magnet 81 includes only the one pair of magnet-side positioning portions 912 which are arranged to be point-symmetric about the rotational axis AX1. The magnet-side positioning portions 912 are used as both the magnetization reference and the assembly reference so that the advantages, which are similar to those of the first embodiment, can be achieved. When the magnet 81 is positioned by fitting the magnet 81 to the center fitting hole 642, which is concentric with the rotational axis AX1, the misalignment between the center of the magnet 81 and the center of the rotor core 38 is less likely to occur.

Third Embodiment

In a third embodiment, as shown in FIGS. 16 to 21, the center body 61 has a pair of fitting holes 653 in place of the center fitting hole 642 of the second embodiment. The fitting holes 653 are spaced from each other in the second direction D2 while the rotational axis AX1 is interposed between the fitting holes 653.

Each of only one pair of core-side positioning portions 713 includes a planar surface 723, which is parallel with the first direction D1, and a partial cylindrical surface 733, which has a center of curvature located on the rotational axis AX1. The planar surface 723 of each of the core-side positioning portions 713 is formed at a radially inner wall of a corresponding one of the fitting holes 653. The planar surfaces 723 of the core-side positioning portions 713 form a two-sided segment while the two-sided segment is defined as a segment that has two planar surfaces which are located at two diametrically opposite sides of the two-sided segment and are parallel with each other. The partial cylindrical surface 733 of the core-side positioning portions 713 is formed at a radially outer wall of the corresponding one of the fitting holes 653.

The magnet 81 includes a main body 833, which is shaped in a ring form, and a pair of projections 843, which axially project from the main body 833 toward the rotor core 38. The projections 843 are spaced from each other in the second direction D2 while the rotational axis AX1 is interposed between the projections 843.

Each of only one pair of magnet-side positioning portions 913 includes a planar surface 923, which is parallel with the first direction D1, and a partial cylindrical surface 933, which has a center of curvature located on the rotational axis AX1. The planar surface 923 of each of the magnet-side positioning portions 913 continuously extends from a radially inner wall of the main body 833 to a side surface of a corresponding one of the projections 843. The planar surfaces 923 of the magnet-side positioning portions 913 are parallel with each other. The partial cylindrical surface 933 of each of the magnet-side positioning portions 913 continuously extends from a radially outer wall of the main body 833 to another side surface of the corresponding one of the projections 843. The projections 843 can be fitted into the fitting holes 653.

In the third embodiment, the rotor core 38 includes only the one pair of core-side positioning portions 713 which are arranged to be point-symmetric about the rotational axis AX1. The magnet 81 includes only the one pair of magnet-side positioning portions 913 which are arranged to be point-symmetric about the rotational axis AX1. The magnet-side positioning portions 913 are used as both the magnetization reference and the assembly reference so that the advantages, which are similar to those of the first embodiment, can be achieved.

Fourth Embodiment

Figure 22:
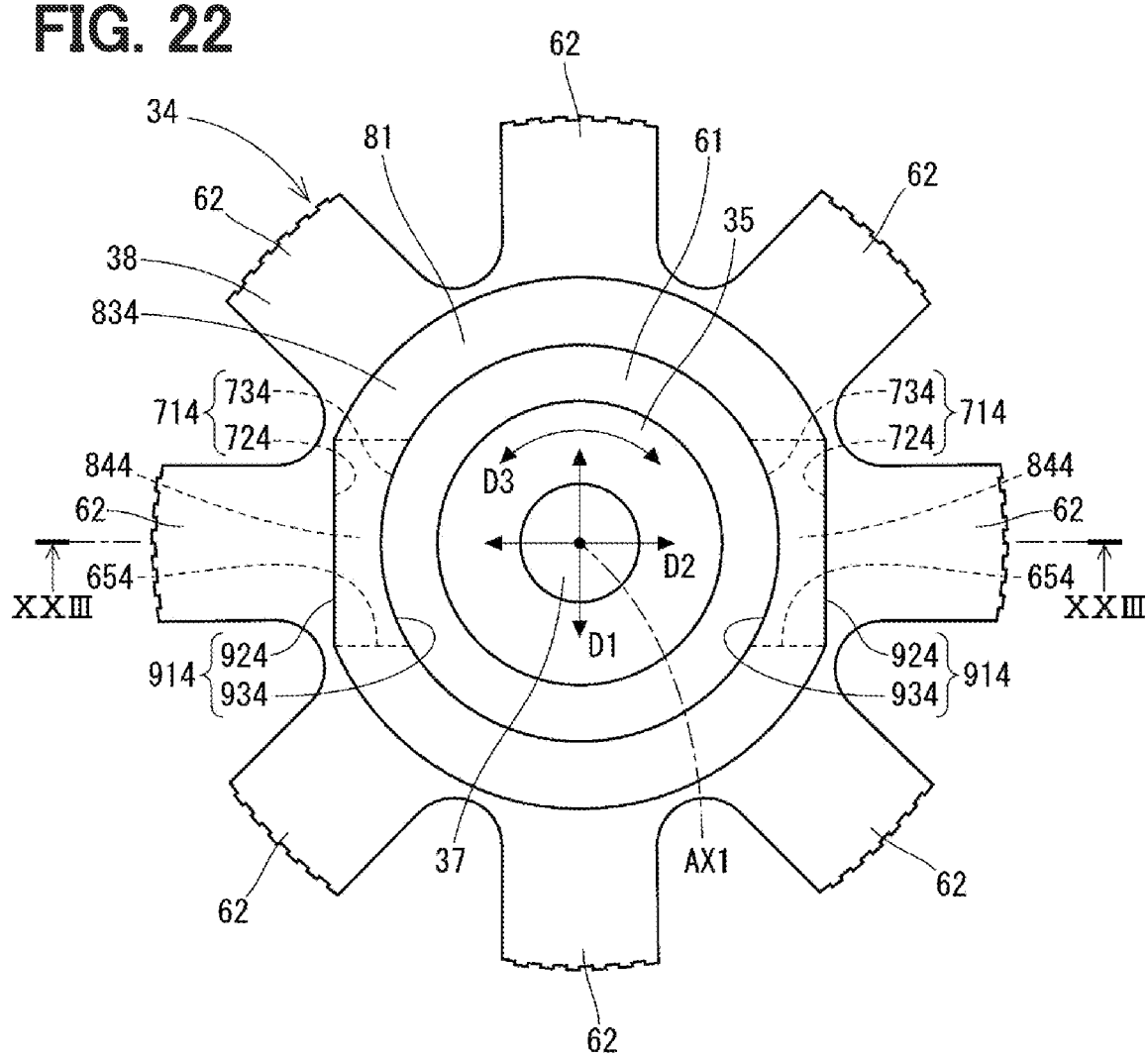
FIG. 22 is a view of a rotor and a motor-side bearing of a fourth embodiment as viewed in the axial direction.
Figure 23:
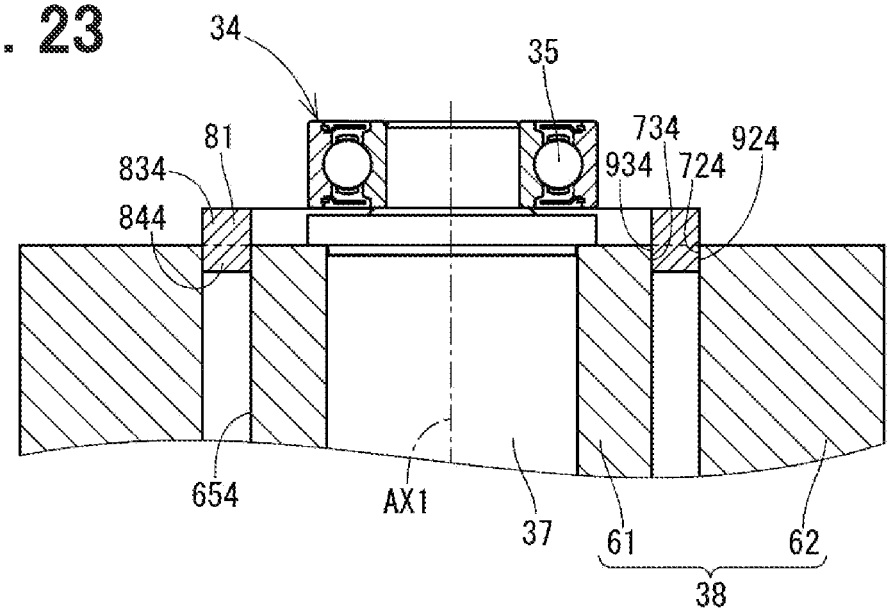
FIG. 23 is a cross-sectional view of the rotor and the motor-side bearing taken along line XXIII-XXIII in FIG. 22.

In a fourth embodiment, as shown in FIGS. 22 to 23, in each of only one pair of core-side positioning portions 714, a location of a planar surface 724 and a location of a partial cylindrical surface 734 are reversed relative to those of the third embodiment. Also, in each of only one pair of magnet-side positioning portions 914, a location of a planar surface 924 and a location of a partial cylindrical surface 934 are reversed relative to those of the third embodiment. The rest of the configuration of the fourth embodiment is the same as that of the third embodiment. For instance, like in the third embodiment, the planar surface 724 and the partial cylindrical surface 734 of each of the core-side positioning portions 714 are formed at the corresponding one of the fitting holes 654, and the planar surface 924 and the partial cylindrical surface 934 of each of the magnet-side positioning portions 914 continuously extend from the main body 834 to the corresponding one of the projections 844.

In the fourth embodiment, the magnet 81 includes only the one pair of magnet-side positioning portions 914 which are arranged to be point-symmetric about the rotational axis AX1, and the magnet-side positioning portions 914 are used as both the magnetization reference and the assembly reference so that the advantages, which are similar to those of the third embodiment, can be achieved.

Fifth Embodiment

Figure 24:
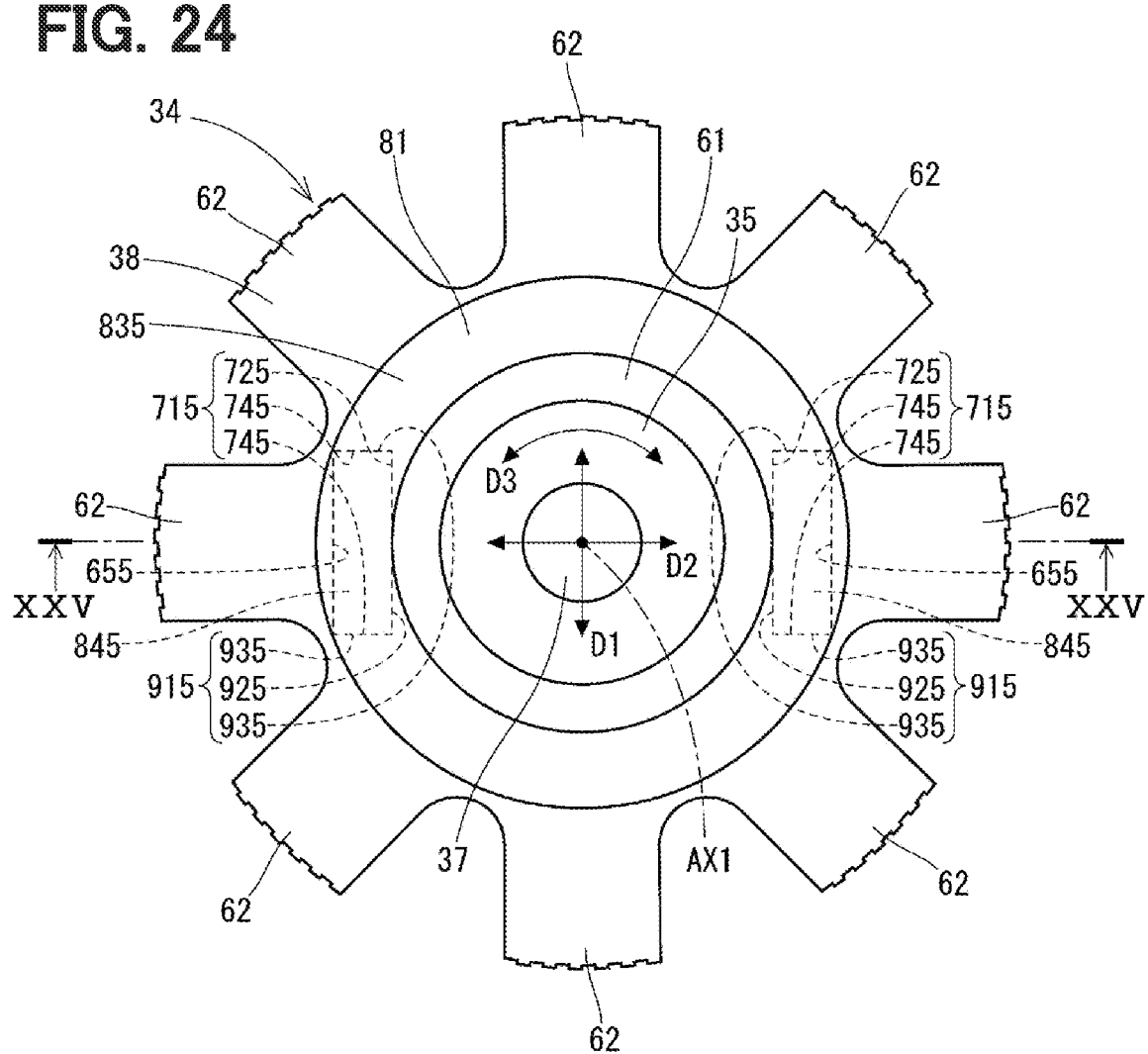
FIG. 24 is a view of a rotor and a motor-side bearing of a fifth embodiment as viewed in the axial direction.
Figure 25:
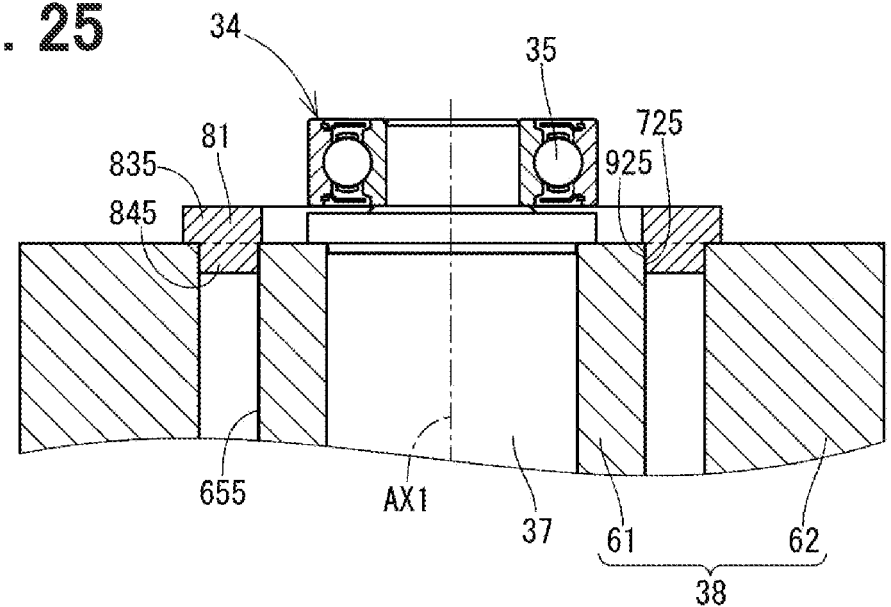
FIG. 25 is a cross-sectional view of the rotor and the motor-side bearing taken along line XXV-XXV in FIG. 24.

In a fifth embodiment, as shown in FIGS. 24 to 25, each of only one pair of core-side positioning portions 715 includes a planar surface 725, which is parallel with the first direction D1, and a pair of planar surfaces 745, which are parallel with the second direction D2. The planar surface 725 is formed at a radially inner wall of the corresponding one of the fitting holes 655. The pair of planar surfaces 745 are formed at two side walls (side surfaces) of the fitting hole 655 which are opposed to each other in the first direction D1.

Each of only one pair of magnet-side positioning portions 915 includes a planar surface 925, which is parallel with the first direction D1, and a pair of planar surfaces 935, which are parallel with the second direction D2. The planar surface 925 of each of the magnet-side positioning portions 915 is formed only at the corresponding one of the projections 845 without extending to the main body 835. The planar surfaces 935 of each of the magnet-side positioning portions 915 are formed only at the corresponding one of the projections 845 without extending to the main body 835. The planar surfaces 935 of each of the magnet-side positioning portions 915 are formed at two side walls (side surfaces) of the corresponding one of the projections 845, which are opposed to each other in the first direction D1.

In the fifth embodiment, the magnet 81 includes only the one pair of magnet-side positioning portions 915 which are arranged to be point-symmetric about the rotational axis AX1, and the magnet-side positioning portions 915 are used as both the magnetization reference and the assembly reference so that the advantages, which are similar to those of the third embodiment, can be achieved.

OTHER EMBODIMENTS

Figure 26:
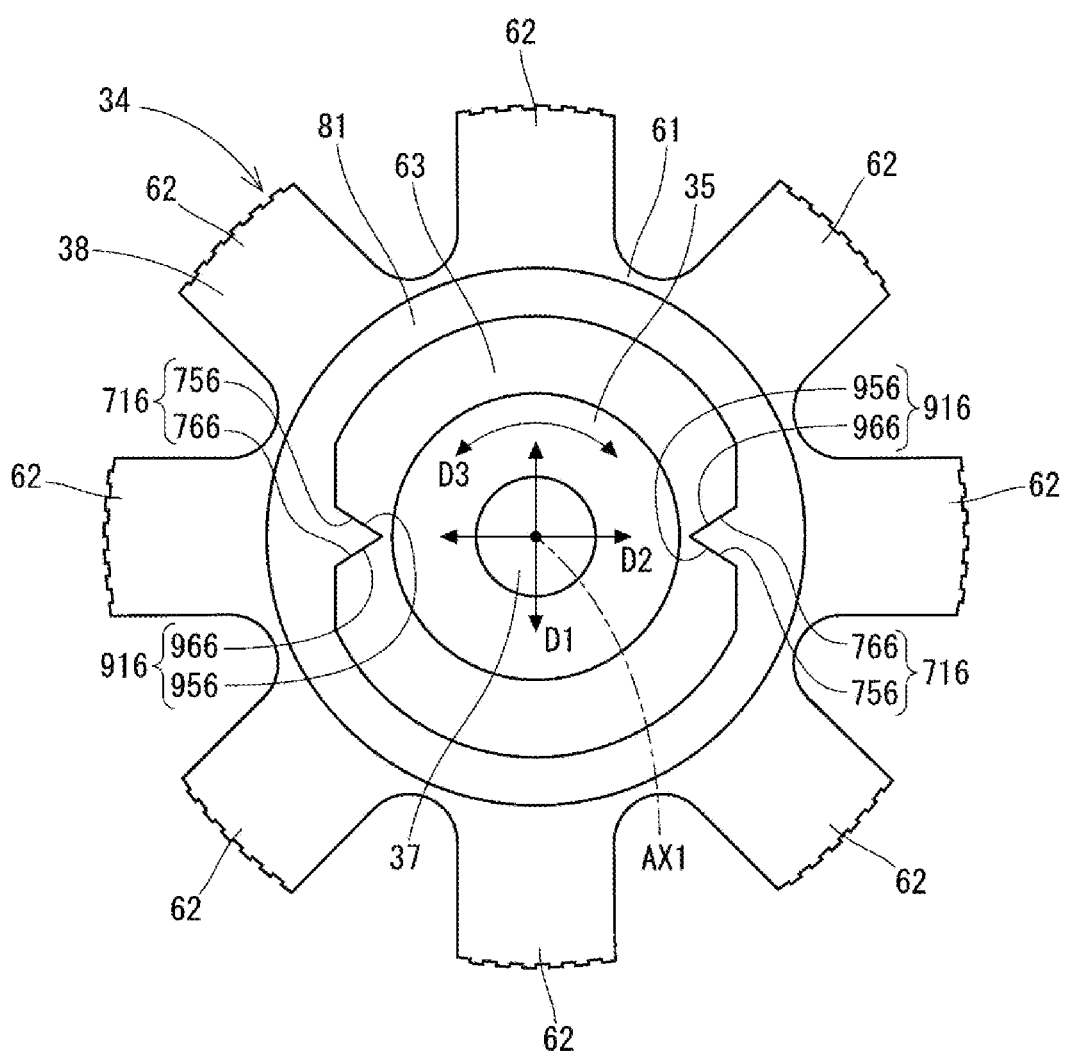
FIG. 26 is a view of a rotor and a motor-side bearing of a first other embodiment as viewed in the axial direction.

In another embodiment, as shown in FIG. 26, each of only one pair of magnet-side positioning portions 916 may include a pair of planar surfaces 956, 966 in place of the planar surface 92 and the partial cylindrical surface 93 of the first embodiment. The planar surface 956 of each of the magnet-side positioning portions 916 is parallel with a direction (a fourth direction) that intersects both of the first direction D1 and the second direction D2. The planar surface 966 of each of the magnet-side positioning portions 916 is parallel with another direction (a fifth direction) that intersects all of the first direction D1, the second direction D2, and the planar surface 956 of the magnet-side positioning portion 916 (or the fourth direction). Even with this configuration, when the planar surfaces 956, 966 of each of the magnet-side positioning portions 916 are engaged with a pair of planar surfaces 756, 766 of a corresponding one of only one pair of core-side positioning portions 716, the magnet 81 is positioned relative to the rotor core 38 in the first direction D1, the second direction D2 and the circumferential direction D3. The magnet-side positioning portions 916 are used as both the magnetization reference and the assembly reference so that the advantages, which are similar to those of the first embodiment, can be achieved. In FIG. 26, the planar surfaces 956, 966 of each of the magnet-side positioning portions 916 are formed at two side walls (side surfaces) of a corresponding one of a couple of projections each of which radially inwardly projects at the magnet 81. Alternatively, in another embodiment, the planar surfaces of each of the pair of magnet-side positioning portions may be formed at two side walls (side surfaces) of a corresponding one of a pair of recesses each of which is radially outwardly recessed at the magnet 81. Furthermore, in another embodiment, each of the pair of magnet-side positioning portions may be formed by a curved convex surface or a curved concave surface in place of the pair of planar surfaces to provide the pair of curved convex surfaces or the pair of curved concave surfaces as the pair of magnet-side positioning portions.

Figure 27:
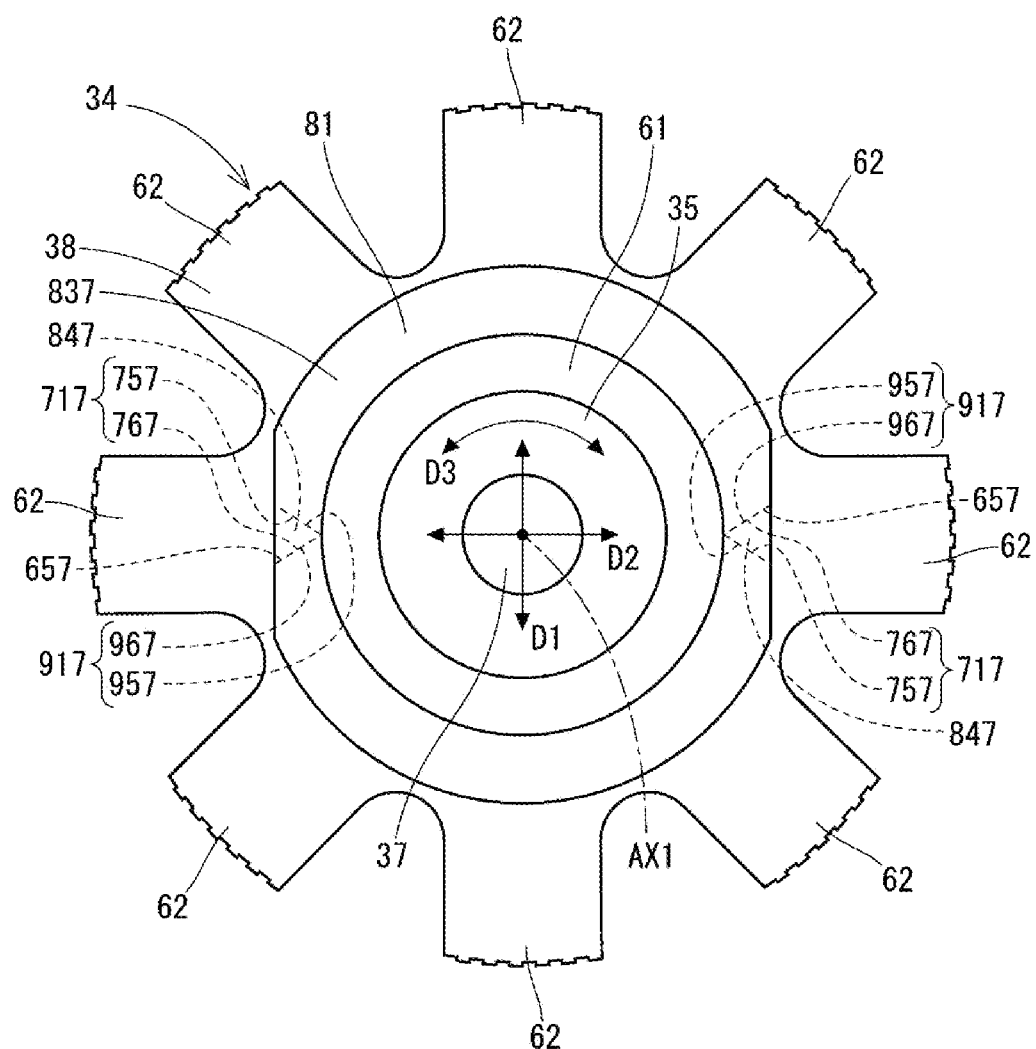
FIG. 27 is a view of a rotor and a motor-side bearing of a second other embodiment as viewed in the axial direction.

In another embodiment, as shown in FIG. 27, each of only one pair of magnet-side positioning portions 917 may include a pair of planar surfaces 957, 967 like the pair of planar surfaces 956, 966 of FIG. 26 in place of the planar surface 923 and the partial cylindrical surface 933 of the third embodiment. The planar surfaces 957, 967 of each of the magnet-side positioning portions 917 are formed at two side walls (side surfaces) of a corresponding one of a pair of projections 847. Even with this configuration, when the planar surfaces 957, 967 of each of the magnet-side positioning portions 917 are engaged with a pair of planar surfaces 757, 767 of a corresponding one of only one pair of core-side positioning portion 717 formed at an inner wall of a corresponding one of a couple of fitting holes 657, the magnet 81 is positioned relative to the rotor core 38 in the first direction D1, the second direction D2 and the circumferential direction D3. The magnet-side positioning portions 917 are used as both the magnetization reference and the assembly reference so that the advantages, which are similar to those of the third embodiment, can be achieved. In FIG. 27, the planar surfaces 957, 967 of each of the magnet-side positioning portions 917 are formed at the two radially outer side walls (side surfaces) of the corresponding one of the pair of projections 847. Alternatively, in another embodiment, the couple of planar surfaces of each of the pair of magnet-side positioning portions may be formed at two radially inner side walls (side surfaces) of a corresponding one of a pair of projections. Furthermore, in another embodiment, each of the pair of magnet-side positioning portions may be formed by a curved convex surface in place of the pair of planar surfaces to provide the pair of curved convex surfaces as the pair of magnet-side positioning portions.

Figure 28:
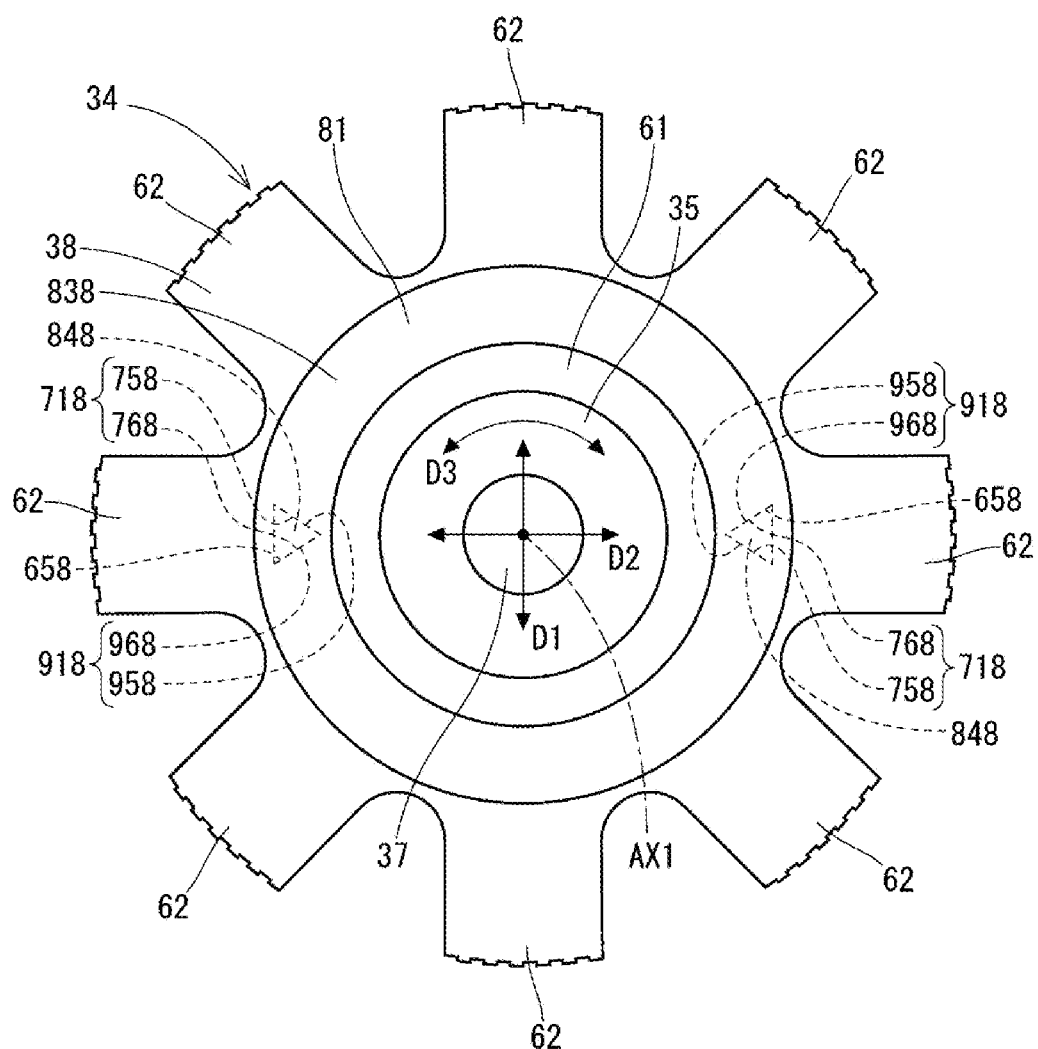
FIG. 28 is a view of a rotor and a motor-side bearing of a third other embodiment as viewed in the axial direction.

In another embodiment, as shown in FIG. 28, each of the magnet-side positioning portions 918 may include a pair of planar surfaces 958, 968 like the pair of planar surfaces 956, 966 of FIG. 26 in place of the planar surface 925 and the pair of planar surfaces 935 of the fifth embodiment. The planar surfaces 958, 968 of each of the magnet-side positioning portions 918 are formed at two side walls (side surfaces) of a corresponding one of a pair of projections 848 at the magnet 81. Even with this configuration, when the planar surfaces 958, 968 of each of the magnet-side positioning portions 918 are engaged with a pair of planar surfaces 758, 768 of a corresponding one of only one pair of core-side positioning portions 718 formed at an inner wall of a corresponding one of a couple of fitting holes 658, the magnet 81 is positioned relative to the rotor core 38 in the first direction D1, the second direction D2 and the circumferential direction D3. The magnet-side positioning portions 918 are used as both the magnetization reference and the assembly reference so that the advantages, which are similar to those of the fifth embodiment, can be achieved. In FIG. 28, the planar surfaces 958, 968 of each of the magnet-side positioning portions 918 are formed at the two radially outer side walls (side surfaces) of the corresponding one of the pair of projections 848. Alternatively, in another embodiment, the couple of planar surfaces of each of the pair of magnet-side positioning portions may be formed at two radially inner side walls (side surfaces) of a corresponding one of a pair of projections. Furthermore, in another embodiment, each of the pair of magnet-side positioning portions may be formed by a curved convex surface in place of the pair of planar surfaces to provide the pair of curved convex surfaces as the pair of magnet-side positioning portions.

The present disclosure is not limited to the embodiments described above and can be implemented in various other forms without departing from the spirit of the present disclosure.

What is claimed is:

1. A rotor for a rotary electric machine, comprising:
   a rotor core that is configured to rotate about a rotational axis; and
   a magnet that is a ring member and is coaxial with the rotor core, wherein the magnet is assembled to an axial end part of the rotor core and is used for sensing a rotational angle of the rotor, wherein:
   in a relative coordinate system to be rotated integrally with the rotor core, a predetermined direction, which is perpendicular to the rotational axis, is defined as a first direction, and a direction, which is perpendicular to the rotational axis and the first direction, is defined as a second direction, and a direction along a circumference about the rotational axis is defined as a circumferential direction;
   the rotor core includes only one pair of positioning portions which are arranged to be point-symmetric about the rotational axis;
   the magnet includes only one pair of positioning portions which are arranged to be point-symmetric about the rotational axis and are respectively engaged with the one pair of positioning portions of the rotor core to position the magnet relative to the rotor core in the first direction, the second direction and the circumferential direction;
   the magnet includes a main body, which is shaped in a ring form, and a pair of projections, which axially project from the main body toward the rotor core; and
   each of the one pair of positioning portions of the magnet has a planar surface which is parallel with the first direction and extends continuously from the main body to a corresponding one of the projections.

2. The rotor according to claim 1, wherein the planar surface of each of the one pair of positioning portions of the magnet is formed at a radially inner wall of the magnet.

3. The rotor according to claim 1, wherein the planar surface of each of the one pair of positioning portions of the magnet is formed at a radially outer wall of the magnet.

4. The rotor according to claim 1, wherein the planar surface of each of the one pair of positioning portions of the magnet extends from a radially inner wall of the main body to a side surface of the corresponding one of the projections.

5. The rotor according to claim 1, wherein the planar surface of each of the one pair of positioning portions of the magnet extends from a radially outer wall of the main body to a side surface of the corresponding one of the projections.

6. A rotor for a rotary electric machine, comprising:
   a rotor core that is configured to rotate about a rotational axis; and
   a magnet that is a ring member and is coaxial with the rotor core, wherein the magnet is assembled to an axial end part of the rotor core and is used for sensing a rotational angle of the rotor, wherein:
   in a relative coordinate system to be rotated integrally with the rotor core, a predetermined direction, which is perpendicular to the rotational axis, is defined as a first direction, and a direction, which is perpendicular to the rotational axis and the first direction, is defined as a second direction, and a direction along a circumference about the rotational axis is defined as a circumferential direction;
   the rotor core includes only one pair of positioning portions which are arranged to be point-symmetric about the rotational axis;
   the magnet includes only one pair of positioning portions which are arranged to be point-symmetric about the rotational axis and are respectively engaged with the one pair of positioning portions of the rotor core to position the magnet relative to the rotor core in the first direction, the second direction and the circumferential direction;
   the magnet includes a main body, which is shaped in a ring form, and a pair of projections, which axially project from the main body toward the rotor core; and
   each of the one pair of positioning portions of the magnet is formed only at a corresponding one of the projections without extending to the main body and has a planar surface which is parallel with the first direction.

\* \* \* \* \*